J. C. HUNT.

Improvement in Apparatus for Steaming Grain.

No. 130,430.  Patented Aug. 13, 1872.

Witnesses:

Inventor:
John C. Hunt
by Coburn & Munday
his Attorneys

UNITED STATES PATENT OFFICE.

JOHN C. HUNT, OF SIOUX CITY, IOWA.

IMPROVEMENT IN APPARATUS FOR STEAMING GRAIN.

Specification forming part of Letters Patent No. 130,430, dated August 13, 1872.

Specification describing certain Improvements in "Flouring-Mills," invented by JOHN C. HUNT, of Sioux City, in the county of Woodbury and State of Iowa.

Nature of the Invention.

This invention relates to the combination, with the grinding mechanism of a flouring-mill, of an apparatus for steaming and heating the grain immediately before it is delivered to the said grinding mechanism.

The advantageous result of this steaming or heating is threefold: It improves the quality of the flour by toughening the bran, so that it is not cut up in grinding, and is hence more easily separated. It increases the quantity of flour, as by toughening the bran the middlings are made finer and may be reground and run into the flour from first grinding, improving both the quality and quantity thereof. It extracts the oily moisture from the grain, whereby the flour is made perfectly dry and will consequently keep much longer without spoiling. The invention also further consists in the device for so heating and steaming the grain, consisting of a vertical drum connected by pipes to a supply of steam, and traversed by vertical pipes for conducting through it the grain, and being so constructed and arranged that the grain may be subjected to the direct action of the steam or not, as desired; and, also, so constructed that the grain is received at the upper end of the drum and caused to flow into the vertical pipes, and after passing through them recollected and discharged at a downward central discharge, which construction will be hereinafter more fully explained.

Figure 1:
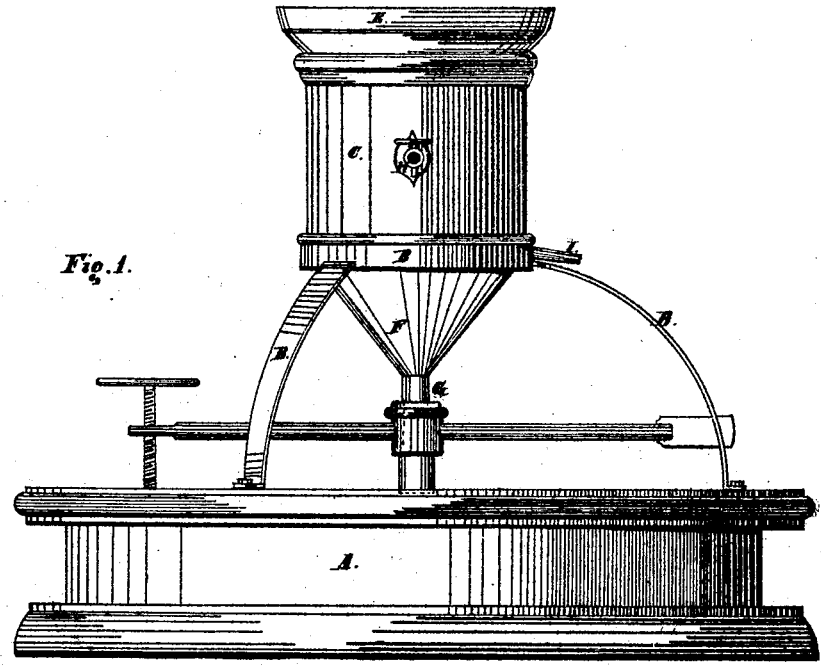
Figure 2:
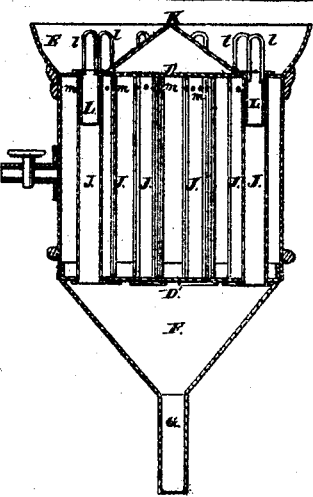
Figure 3:
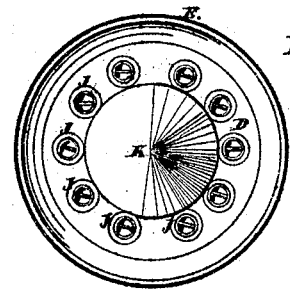

In the accompanying drawing, which forms a part of this specification, Figure 1 represents a side elevation of a grinding mechanism with steamer and heater applied. Fig. 2 represents a vertical central section of the steamer and heater detached, and Fig. 3 represents a top or plan view of said steamer and heater.

Like letters of reference made use of in the several figures indicate like parts.

To enable those skilled in the art to make and use my invention, I will proceed to describe the same with particularity, making use in so doing of the aforesaid drawing by letters of reference thereto.

General Description.

A represents the curb, which envelops the millstones. B is a suitable frame-work resting upon said curb, and arranged to support the steaming and heating apparatus, which latter consists of a steam-drum, C, having a cylindrical or other suitable form, and inclosed by the upper and lower heads D D'. The upper head D is surrounded by a hopper or inclosing wall, E, so that the grain descending from the garner will be received, and to the bottom of the drum is attached a funnel, F, terminating in a discharge-pipe, G, to direct the grain after passing the drum to the eye of the stone. The said drum is furnished with a steam-supply pipe and cock, H, and at a lower point with a drip-cock, I, for discharging the condensed steam. A number of vertical pipes or tubes, J, pass through the drum from one head to the other, forming passage-ways for the grain. These tubes J are arranged around the drum at points equidistant from the center, so that the flow of the grain shall be equal to all, and to guide the grain to them and prevent it from resting upon the heated upper head a cone, K, is affixed to the upper head, which acts to shed the grain equally to every side into the tubes. The upper end of each of the tubes J is pierced with a row of holes, $m$, forming communication with said tubes and the interior of the drum, so that as the grain enters said tubes it is met by a series of steam-jets, which act to heat and soften the exterior coating thereof. And as it may not always be necessary or desirable to allow the steam to come in direct contact with the grain, as in the case of damp or frozen wheat, I employ a series of short tubes, L, open at both ends, fitting snugly within the tubes J, and operated to slide up or down by the handle or bail $l$, so as to close or disclose the apertures $m$, and to allow more or less of steam or shut it off entirely. The grain may be thus subjected to a steaming and heating process combined, or it may be simply heated by passing through the steam-heated tubes without direct contact with the steam.

*Claims.*

Having thus fully described the construction and operation of my invention, what I claim as new, and desire to secure by Letters Patent, is—

1. The steam-drum C D D′, fitted with tubes J, reservoir E, and funnel F, substantially as and for the purpose specified.

2. The cone K, in conjunction with the drum C D D′, tubes J, and reservoir or wall E, substantially as specified.

3. The series of tubes J having apertures m, in combination with the sliding concentric short tubes L, substantially as specified and shown, and for the purpose set forth.

JOHN C. HUNT.

Witnesses:
CRAIG L. WRIGHT,
WM. L. JOY.